(12) United States Patent
Grobben et al.

(10) Patent No.: US 12,116,218 B2
(45) Date of Patent: Oct. 15, 2024

(54) SYSTEM FOR SORTING PRODUCTS

(71) Applicant: Vanderlande Industries B.V., Veghel (NL)

(72) Inventors: Koen Maarten Geert Grobben, Veghel (NL); Petrus Theodorus Cornelis Vervoort, Veghel (NL)

(73) Assignee: Vanderlande Industries B.V., Veghel (NL)

( * ) Notice: Subject to any disclaimer, the term of this patent is extended or adjusted under 35 U.S.C. 154(b) by 87 days.

(21) Appl. No.: 18/014,396

(22) PCT Filed: Jun. 29, 2021

(86) PCT No.: PCT/NL2021/050403
§ 371 (c)(1),
(2) Date: Jan. 4, 2023

(87) PCT Pub. No.: WO2022/010345
PCT Pub. Date: Jan. 13, 2022

(65) Prior Publication Data
US 2023/0257212 A1   Aug. 17, 2023

(30) Foreign Application Priority Data

Jul. 9, 2020   (NL) ..................... 2026037

(51) Int. Cl.
*B65G 47/84*   (2006.01)
*B65G 17/08*   (2006.01)
*B65G 43/08*   (2006.01)

(52) U.S. Cl.
CPC ........... *B65G 47/844* (2013.01); *B65G 43/08* (2013.01); *B65G 17/08* (2013.01); *B65G 2207/36* (2013.01)

(58) Field of Classification Search
CPC ...... B65G 47/844; B65G 43/08; B65G 17/08; B65G 2207/36
(Continued)

(56) References Cited

U.S. PATENT DOCUMENTS 5,921,378 A * 7/1999 Bonnet .................. B65G 17/08
198/850
6,705,452 B2 * 3/2004 Greve .................. B65G 47/844
198/370.02

(Continued)

FOREIGN PATENT DOCUMENTS

| EP | 1422173 A1 | 5/2004 |
| WO | 2020022896 A1 | 1/2020 |

OTHER PUBLICATIONS

International Search Report and Written Opinion of the International Searching Authority issued in corresponding application PCT/NL2021/050403 mailed Sep. 3, 2021 (10 pages).

*Primary Examiner* — Mark A Deuble
(74) *Attorney, Agent, or Firm* — Carter, DeLuca & Farrell LLP

(57) ABSTRACT

System for sorting products comprising a number of combinations of an elongated carrying body and a pusher body, located one after another, which combinations are movable in a direction of movement following a path along which a number of sorting locations are provided, wherein the carrying bodies extend parallel to each other and perpendicular to the direction of movement and wherein the carrying bodies are configured for carrying the products to be sorted, a displacing device for moving the combinations in the direction of movement along the path, wherein each combination is further provided with a further displacing device comprising an electric motor for moving the pusher body in a sorting direction along the carrying body, the sorting direction extending perpendicularly to the direction of
(Continued)

movement, for pushing a product carried by the carrying body off of the carrying body with the pusher body, and, amongst other, a plurality of controllers.

17 Claims, 4 Drawing Sheets

(58) Field of Classification Search
USPC .................................................. 198/370.02
See application file for complete search history.

(56) References Cited

U.S. PATENT DOCUMENTS

| | | | |
|---|---|---|---|
| 9,371,194 B2* | 6/2016 | Ragan | B65G 17/345 |
| 11,447,344 B2* | 9/2022 | Grobben | B07C 3/08 |
| 2005/0011725 A1* | 1/2005 | Lapeyre | B65G 47/844 |
| | | | 198/370.02 |
| 2005/0103599 A1* | 5/2005 | Hartness | B65G 47/842 |
| | | | 198/479.1 |
| 2008/0035450 A1* | 2/2008 | Haan | B65G 47/844 |
| | | | 198/370.02 |
| 2010/0012464 A1* | 1/2010 | Schiesser | B65G 43/08 |
| | | | 198/460.1 |
| 2012/0031731 A1* | 2/2012 | Onayama | B65G 43/08 |
| | | | 198/370.02 |
| 2013/0167751 A1 | 7/2013 | Rosenwinkel | |
| 2022/0306398 A1* | 9/2022 | Enenkel | B65G 47/503 |
| 2024/0059498 A1* | 2/2024 | Grobben | H04B 5/28 |

* cited by examiner

SYSTEM FOR SORTING PRODUCTS

CROSS-REFERENCE TO RELATED APPLICATION

This application is a National Stage Application under 35 U.S.C. § 371(a) of PCT/NL2021/050403, filed Jun. 29, 2021, which claims the benefit of and priority to Netherlands Patent Application No. 2026037 filed Jul. 9, 2020. The entire contents of all of the foregoing applications are incorporated by reference herein.

BACKGROUND

The present invention relates to a system for sorting products comprising a number of successive combinations of an elongated carrying body and a pusher body, located one after another, movable in a direction of movement following a path along which a number of sorting locations are provided, wherein the carrying bodies extend parallel to each other and perpendicular to the direction of movement and wherein the carrying bodies are configured for carrying the products to be sorted, a displacing device for moving the combinations in the direction of movement along the path, wherein each combination is further provided with a further displacing device comprising an electric motor for moving the pusher body in a sorting direction along the carrying body, the sorting direction extending perpendicularly to the direction of movement, for pushing a product carried by the carrying body off of the carrying body with the pusher body, and a plurality of controllers, wherein each of the plurality of controllers is provided on a combination of the elongated carrying body and the pusher body.

In the PCT patent application PCT/NL2019/050488, a system of this kind is described. This particular patent application focuses on the concept that the system comprises a distance-determining device that is configured for determining a distance parameter that is related to the, or at least a, distance viewed in the sorting direction between a pusher body of a combination, of which the carrying body carries a product to be sorted and the product to be sorted carried by the carrying body and for sending the distance parameter to an on-board control system, wherein the on-board control system is configured for controlling an on-board driving device of the combination on the basis of this distance data.

The system described above has the drawback that the communication topology is left in the middle. The central server is to provide data to the controllers associated with the combinations, but there is no effective topology described to accomplish this particular aspect. The present invention aims to provide a system for sorting products having an effective communication topology for exchanging data between the central control server and the plurality of controllers.

SUMMARY

As such, in a first aspect, there is provided a system for sorting products comprising:
a number of successive combinations of an elongated carrying body and a pusher body, located one after another, which combinations are movable in a direction of movement following a path along which a number of sorting locations are provided, wherein the carrying bodies extend parallel to each other and perpendicular to the direction of movement and wherein the carrying bodies are configured for carrying the products to be sorted,
a displacing device for moving the combinations in the direction of movement along the path,
wherein each combination is further provided with a further displacing device comprising an electric motor for moving the pusher body in a sorting direction along the carrying body, the sorting direction extending perpendicularly to the direction of movement, for pushing a product carried by the carrying body off of the carrying body with the pusher body,
a plurality of controllers, wherein each controller is provided on a combination of the elongated carrying body and the pusher body, and wherein each one of the plurality of controllers is arranged to control two or more of the further displacing devices by receiving destination data from a central control server relating to a sorting location where a product to be sorted should be pushed off of the carrying body and for driving the electric motor in accordance with the received destination data;
at least one stationary placed Access Point, AP, wherein the at least one AP is arranged to communicate with the plurality of controllers and with the central control server;
the central control server arranged for transmitting destination data relating to the sorting location where a product to be sorted should be pushed off of the carrying body, to one or more of the plurality of controllers via the at least one stationary placed AP.

It is noted that, typically, the length of a system may range from tens of meters to even hundreds of meters. Each of the elongated carrying bodies may be coupled to one another, or may be situated next to one another, to form a closed circuit. The result is that thousands of elongated carrying bodies may be provided, given typical dimensions for the elongated carrying body, for example fifty to 200 mm. For example, In one example discussed with respect to the figures it is assumed that a system comprises 3200 elongated carrying bodies.

Products to be sorted may be pushed onto, or placed on top of, the elongated carrying bodies. The dimensions of the elongated carrying bodies may be such that a product spans at least two consecutively situated elongated carrying bodies.

An elongated carrying body is provided with a pusher body, wherein the pusher body is able to move, with respect to the carrying body, in the sorting direction. An electric motor, for example a Direct Current, DC, motor, is provided for each combination of elongated carrying body with its pusher body for moving the pusher body in the sorting direction along the carrying body. In operation, the pusher body is pushed against the product to be sorted such that the product to be sorted is pushed from its corresponding elongated carrying body.

As mentioned above, a product typically spans at least two consecutively situated elongated carrying bodies such that at least two pusher bodies are to be controlled together for pushing the product off of the corresponding elongated carrying bodies.

The above paragraphs describe the mechanical actions required for pushing a particular product to be sorted from its corresponding elongated carrying bodies.

The inventors have found that the communication topology, for, in the end, controlling the further displacing devices, may be implemented effectively when the communication topology is layered. The highest layer of the communication topology comprises the central control server. The central control server is arranged to coordinate data transmission to any of the devices in the lower layers of the communication topology.

The lowest layer of the communication topology comprises the plurality of controllers. Each of the plurality of controllers are provided on, or are associated with, a combination of an elongated carrying body and a pusher body. However, each of these controllers is arranged to control two or more of the further displacing devices. So, for example, for a system that comprises 3200 combinations, a maximum of 1600 controllers would be required for controlling the further displacing devices.

It is noted that the controllers thus also move, in operation, in the same direction of movement following the path along which a number of sorting locations are provided.

The second layer of the communication topology comprises at least one stationary Access Point, AP, wherein the at least one AP is arranged to communicate with the plurality of controllers and with the central control server.

The at least one AP is stationary meaning that the AP is not to move, in operation, like the plurality of controllers. The inventors have found that the communication between the stationary AP and the plurality of moving controllers may be effectively dealt with in a couple of manners, which is elucidated in more detail later below.

Following the above, a system that comprises 3200 combinations, and a maximum of 1600 controllers, may comprise 4 Access Points or the like.

The inventors have found that the above described communication topology has several advantages.

First, the complexity of the communication topology is reduced. This is mainly caused by the aspect that each controller is arranged to control two or more of the further displacing devices. It was found that it is unnecessary that each combination is equipped with a single controller. That would lead to increased costs and increased complexity, for example wiring complexity, which is undesired.

As mentioned before, it is likely that a particular product spans two or more elongated carrying bodies. Following the insight of the inventors, it becomes more likely that a product to be sorted is, effectively, controlled by a single controller given that the single controller also controls two or more further displacing devices. This reduces potential synchronization issues between multiple controllers.

Second, the controllers do no longer need to communicate directly with the central server. This reduces potential message collisions in case of a shared medium, or reduces complexity, for example wiring complexity, in point-to-point connections in case of a non-shared medium. The total amount of message exchanged between the central control server and all the controllers are reduced in that a single controller is arranged to control two or more further displacing devices.

Third, by reducing the number of total controllers present in the system, the total amount of weight that is to be moved is reduced and the total amount of costs is reduced. Each of the controllers move along with the combinations in the direction of movement. The total amount of energy required is thus reduced by reducing the number of controllers.

In an example, each controller of the plurality of controllers is arranged to control between four and six of the further displacing devices.

It was found that it may be beneficial if four to six further displacing devices are to be controlled by each controller. The processing abilities that are then required by each of the controllers may then still be met. That is, the controller may have the processing capabilities to control 4-6 controllers.

The inventors have found that there may be a trade off in the number of controllers and the inconveniences whenever a particular controller malfunctions. For example, if one controller would control tens of further displacing devices at a time, then all those tens of further displacing devices would become unusable in case of a malfunction, i.e. an error, in the controller. This would lead to a reduction in efficiency.

It is noted that, in accordance with the present disclosure, the number of combinations are located one after another. These combinations may be located directly one after the other. Another option is that one or more carrying bodies are located between two combinations. In such a case, the particular pusher body may then be formed in such a way that it not only covers the corresponding carrying body, but also at least a part of one or more neighbouring carrying bodies.

In a further example, the system further comprises:
a stationary placed leaky coax cable extending along the combinations in the direction of movement along the path, and wherein the leaky coax cable is connected to the at least one stationary AP;
a plurality of antennae, wherein each antenna is provided at an elongated carrying body of a corresponding combination such that the antenna is proximal to the stationary placed leaky coax cable, wherein the antenna allows for communication between the stationary at least one AP and the plurality of controllers.

The communication topology is divided, physically, in a part that is stationary and a part that is moving during operation. The stationary placed leaky coax cable enables the communication to go from a static, stationary environment to a moving environment. The moving environment comprises the controllers and the plurality of antennae, while the static, stationary environment comprises the at least one AP and the central control server.

In a further example, the system comprises:
one or more gateways, wherein each of the one or more gateways is provided on a combination of the elongated carrying body and the pusher body, and wherein each of the one or more plurality of controllers is uniquely connected to one of the one or more gateways, and wherein each of the one or more gateways is arranged to communicate with the central control server, via the at least one AP.

It was found that it may be beneficial to add another communication layer to the communication topology, wherein the another communication layer resides between the highest layer, being the central control server, and the second layer, being the plurality of controllers.

Each gateway may, for example, be coupled to 32 controllers. Preferably, each gateway may be coupled to 8 controllers. Here, each of the one or more gateways may comprise one of the plurality of antennae.

In a further example, the system further comprises a scanner arranged for obtaining at least one of product parameters of the products to be sorted, and for providing these product parameters to the central control server, wherein the product parameters are any of:
Identifications, ID's, related to which two or more carrying bodies are carrying a particular product to be sorted;
a length and/or a width parameter of a particular product to be sorted;

an offset, in the sorting direction, of a particular product to be sorted on a carrying body from an initial position of the corresponding pusher body.

The system in accordance with the present disclosure provide for an increased amount of flexibility. That is, the movement of each of the pusher bodies may be controlled separately and independently. The controllers may thus control the DC motor in such a way that the displacement over time of a particular pusher body is tailored to what is actually required for efficiently pushing a particular product off of its carrying body.

The inventors have found that multiple variables may play a role in determining how a particular product is to be sorted. For example, the length and/or the width parameter of a particular product may be taken into account. The length of a product may determine how many, and which, pusher bodies are to be controlled. As mentioned above, typically, a product spans at least two pusher bodies, but may also span even more pusher bodies. The length of a particular product may, thus, implicitly or explicitly determining the amount of pusher bodies that are required for pushing that particular product off of the corresponding carrying bodies.

The length and/or the width and/or the position of a product, may not only determine which pusher bodies are required for pushing a particular product off of the corresponding carrying bodies, but may also determine a foremost pusher body and/or a rear-end pusher body for assisting in the push off process. For example the foremost pusher body, i.e. the pusher body that is just in front of the particular product to be sorted, may be controlled to a certain position that is in front of the particular product. This prevents the particular product to move, with respect to its corresponding carrying bodies, in the direction of movement. The particular product will thus stay on its place on the corresponding carrying bodies. The same as above is also true for the foot-end pusher body, i.e. the pusher body that is at the end of the product to be sorted. The directions front and rear are defined as seen in the direction of movement.

The offset of a particular product to be sorted may also be taken into account. A pusher body may be controlled such that it approaches the product to be sorted relatively slowly, wherein the pusher body is moved against, or close to, the product. Once the product to be sorted is at the sorting location, the pusher body may be controlled in its push off process, wherein the pusher body may follow a predetermined sorting profile for pushing the particular product off of the respective carrying body.

In another example, the central control server is arranged for selecting one or more of the plurality of controllers based on the Identifications, ID's, received from the scanner, and wherein the central control server is further arranged for transmitting the product parameters being any of the length parameter, width parameter and the offset to the selected one or more of the plurality of controllers.

Such product parameters should, preferably, be sent before the product is at the sorting location. This ensures that the controllers may take the product parameters into account when pushing the product off of the corresponding carrying bodies.

The system in accordance with the present disclosure and, more specifically, the communication topology used in the system may utilize different kinds of communication technologies, for example Wireless Local Area Network, WLAN, Bluetooth and Zigbee.

Preferably, WLAN is the communication technique that is used for the communication technology as WLAN may support the bitrates that are required by the system. As mentioned above, the system may comprise a plurality of controllers, and each of these controllers may need to communicate with the central control server. The total amount of data packets that are exchanged between the central control server and the plurality of controllers may add up. The inventors have found that WLAN may support such type of communications.

In a further example, each of the selected one or more of the plurality of controllers is arranged for controlling corresponding further displacing devices based on any of the received length parameter, width parameter and/or the offset.

In an example, each of the one or more of the plurality of controllers is arranged for controlling further displacing devices based on sorter parameters, wherein the sorter parameters are any of:
 an outfeed angle being an angle between the sorting direction and an outfeed direction of an outfeed connected to the system;
 a width of the outfeed;
 a location of the outfeed;
 expected speed of the product to be sorted on the outfeed.

Here, each of the plurality of controllers may be arranged for determining a sorting profile for a corresponding pusher body based on any of the sorter parameters and the product parameters, wherein the sorting profile relates to a position of the pusher body with respect to its corresponding elongated carrying body.

The inventors have found that it may be beneficial to take into account the product parameters and/or the sorting parameters, for determining an effective manner for pushing a particular product off of the corresponding elongated bodies.

As mentioned above, the product parameters relate to parameters of the product itself like the length, the width or the position of the product. Optionally, the weight of the product may be taken into account.

The sorting parameters relate to parameters of the system itself, like the outfeed angle, the width of the outfeed, the location of the outfeed and/or the expected speed of the product to be sorted on the outfeed. These kinds of parameters may be taken into account when sorting a particular product off of the corresponding elongated bodies.

For example, the expected speed of the product to be sorted on the outfeed may be taken into account by the controller for determining the exit speed of the corresponding pusher body. That is, it may be beneficial if the exit speed of the corresponding pusher body is tuned to the expected speed of the product to be sorted.

Another option that may be considered is the outfeed width and/or the outfeed angle. The system may utilize that information to steer the corresponding pusher bodies for a particular product to be sorted. For example, the inventors have found that the product may be rotated if the length of the product exceeds the width of the outfeed. As such, the product may be rotated into a first position, wherein the pusher bodies that are located at the front of the product are controlled to have a higher offset compared to the pusher bodies that are located at the beginning of the product.

In a further example, each of the plurality of controllers is arranged for:
 controlling a corresponding pusher body, via the further displacing device, to an initial position such that the corresponding pusher body is against, or close to, a product to be sorted;
 sorting the product to be sorted by controlling the further displacing device, at the sorting location, such that the corresponding pusher body follows the sorting profile starting from the initial position.

It was found that it may be beneficial to control the pusher bodies to an initial position and that, in a second step, the product is to be sorted in such a way that the corresponding pusher bodies follow a determined, or predetermined, sorting profile. The sorting profile may be determined by the controllers based on the product parameters and/or the sorting parameters, or may be predetermined by, for example, an operator of the system. The above allows for an efficient way of sorting the product, wherein the risk of any errors is reduced.

In a second aspect, there is provided a method of sorting a product to be sorted, using a system in accordance with any of the previous claims, wherein the method comprises the steps of:
- receiving, by one of the plurality of controllers, from the central control server via the at least one stationary placed AP, destination data relating to the sorting location where the product to be sorted should be pushed off of the carrying body;
- controlling, by the one of the plurality of controllers, any of the two or more of the further displacing devices at the sorting location by driving the corresponding electric motor in accordance with the received destination data.

It is noted that the advantages and definitions as disclosed with respect to the embodiments of the first aspect of the invention also correspond to the embodiments of the second aspect of the invention, being the method of sorting a product to be sorted.

In an example, the step of receiving comprises:
- receiving at least one of product parameters, wherein the product parameters are any of:
  - Identifications, ID's, related to which two or more carrying bodies are carrying a particular product to be sorted;
  - a length and/or a width parameter of a particular product to be sorted;
  - an offset, in the sorting direction, of a particular product to be sorted on a carrying body from an initial position of the corresponding pusher body,
- and wherein the step of controlling is further based on any of the product parameters.

In a further example, the step of receiving comprises:
- receiving at least one of sorter parameters, wherein the sorter parameters are any of:
  - an outfeed angle being an angle between the sorting direction and an outfeed direction of an outfeed connected to the system;
  - a width of the outfeed;
  - a location of the outfeed;
  - expected speed of the product to be sorted on the outfeed;
- and wherein the step of controlling is further based on any of the sorter parameters.

In another example, the method further comprises the step of:
- determining, by the one of the plurality of controllers, a sorting profile for a corresponding pusher body based on any of the product parameters and/or the sorter parameters, wherein the sorting profile relates to a position of the pusher body with respect to its corresponding elongated carrying body, and
- wherein the step of controlling comprises controlling the corresponding further displacing device such that the corresponding pusher body follows the sorting profile.

In an example, the method further comprises the steps of:
- controlling, by the one of the plurality of controllers, a corresponding pusher body, via the further displacing device, to an initial position such that the corresponding pusher body is against, or close to, a product to be sorted;
- sorting, by the one of the plurality of controllers, the product to be sorted by controlling the further displacing device, at the sorting location, such that the corresponding pusher body follows the sorting profile.

In a third aspect, there is provided a computer program product comprising computer readable medium having instructions stored thereon which, when executed by a controller, cause the controller to implement a method in accordance with any of the examples as provided above.

BRIEF DESCRIPTION OF THE DRAWINGS

The invention will be explained in more detail hereunder on the basis of the description of a number of possible embodiments of the invention, referring to the following figures.

DETAILED DESCRIPTION

Figure 1:
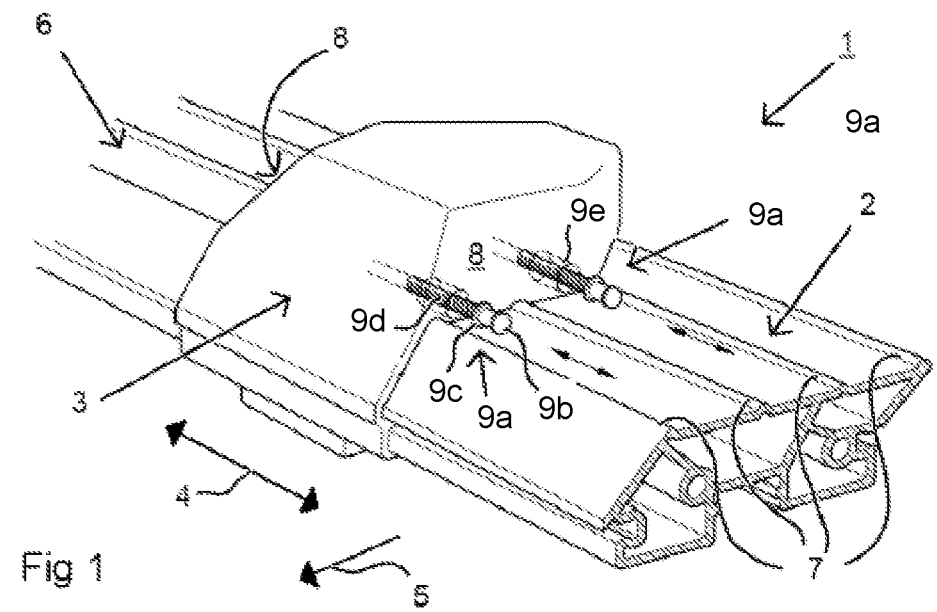
FIG. 1 shows a perspective view of a combination forming part of a sorting system according to the invention.

FIG. 1 shows the end portion of a combination 1 of an elongated carrying body 2, to be denoted hereinafter with the term slat, and a pusher body 3, to be denoted hereinafter with the term pusher shoe. Pusher shoe 3 is movable along slat 2 in two opposite sorting directions according to double-headed arrow 4 that extends parallel to the longitudinal direction of slat 2, in a manner that will be explained in more detail on the basis of FIGS. 2 and 3. Combination 1 is one of a large number of identical combinations which together form a closed circuit and form part of a system for sorting products.

Figure 5:
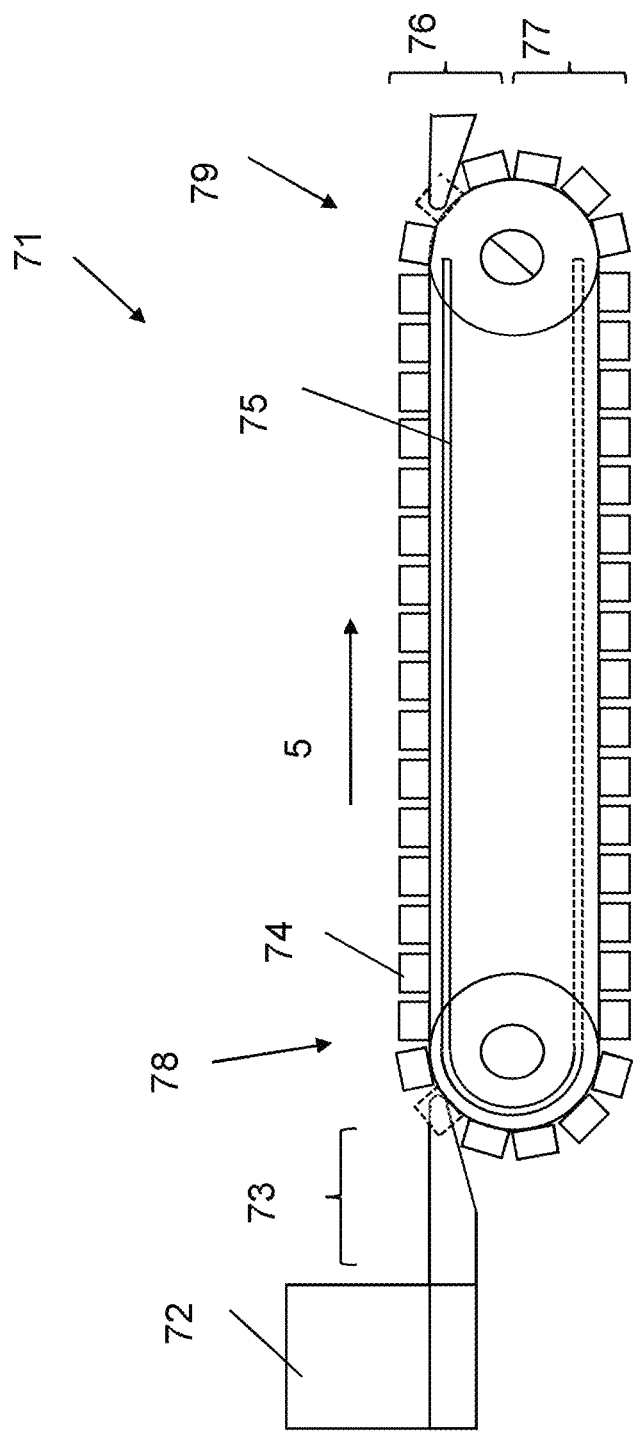
FIG. 5 shows a side view of a system in accordance with the present disclosure.

The slats 2 extend parallel to each other for example as is also shown in FIG. 5. The closed circuit comprises an upper part and a lower part located directly thereunder. The upper part and the lower part extend as horizontal surfaces with a length of typically tens of metres. The upper part and the lower part are joined to each other at their ends via semi-arcuate parts of the closed circuit.

The slats 2 are, at their longitudinal ends, coupled to chains that also run along the closed circuit. Gears engage with the chains at least at the site of the arcuate parts of the closed circuit. At least some of these gears are driven by one or a number of electric motors so that the successive combinations 1 can be moved in a direction of movement 5 that extends perpendicular to the sorting directions 4, along an endless transport path that is of identical shape to the shape of the closed circuit of the combinations 1.

The sorting process, which is to be explained in more detail, takes place at the site of the upper part, see for example reference numeral 76 in FIG. 5, of the transport path. The lower part, see for example reference numeral 77 in FIG. 5, is used for realizing an endless transport path. The upper part of the transport path is indicated with the term sorting path and has an upstream end, see for example reference numeral 78 in FIG. 5, and a downstream end, see for example reference numeral 79 in FIG. 5. This manner of driving combinations of slats and pusher shoes is familiar to a person skilled in the art and therefore does not require further detailed description here.

Slat 2 may be an extruded aluminium profile. FIG. 1 shows a combination 1, with a carrying surface 6 with four equally spaced carrying ribs 7 extending in the longitudinal direction of slat 2, for a product to be carried thereon.

In use, a product to be sorted, such as a parcel, is supplied at the site of the upstream end of the sorting path, to a combined carrying surface such as is formed by a number of successive carrying surfaces 6 located one after another. This combined carrying surface supports the product 84, 85, 86 during movement of the respective combinations 1 in the direction of movement 5. The respective product 84, 85, 86 is intended, at the site of a sorting location, where typically a chute or roller table is provided along the path of the combinations 1, to be pushed off of the combined carrying surface by means of the pusher shoes 3 that form part of the associated combinations 1. Logically, the product to be sorted is located on the side a corresponding pusher bodies 3 that is facing the respective sorting location. The central control system of the sorting system is in possession of data relating to the aforementioned sorting location for the respective product 84, 85, 86 to be sorted Each combination 1 is provided with a further displacing device comprising an electric motor for moving the pusher body 3, relative to the slat 2, in the sorting direction along the carrying body. Two possible embodiments utilizing such a further displacing device, not to be regarded as limiting the invention, are described on the basis of FIGS. 2 and 3.

Figure 2:
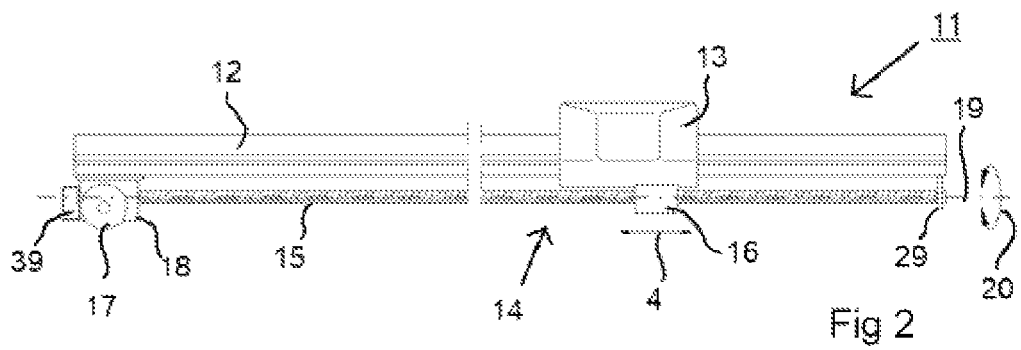
FIG. 2 shows a side view of a pusher body.

FIG. 2 discloses a combination 11 of a slat 12 and a pusher shoe 13 movable relative to slat 12 in two opposite sorting directions 4. For said movement, combination 11 is provided on the underside of slat 12 with a spindle transmission 14 with a threaded spindle 15 and a nut 16 that surrounds threaded spindle 15 and engages therewith. Nut 16 is connected to pusher shoe 13, on the underside thereof. The further displacing device further comprises a servomotor 17, i.e. the electric motor, which, via right-angled transmission 18, connects rigidly with slat 12 to one end thereof, is coupled to one end of threaded spindle 15.

At the opposite end, threaded spindle 15 is mounted rotatably in bearing body 29, which is connected rigidly to slat 12. Excitation of servomotor 17 results in threaded spindle 15 rotating about centre line 19 in one of the two directions according to double-headed arrow 20. Nut 16 is moved thereby in a sorting direction 4. On account of the coupling between nut 16 and pusher shoe 13, pusher shoe 13 will therefore also move in one of the two oppositely directed sorting directions 4, parallel to the longitudinal direction of slat 12.

Figure 3:
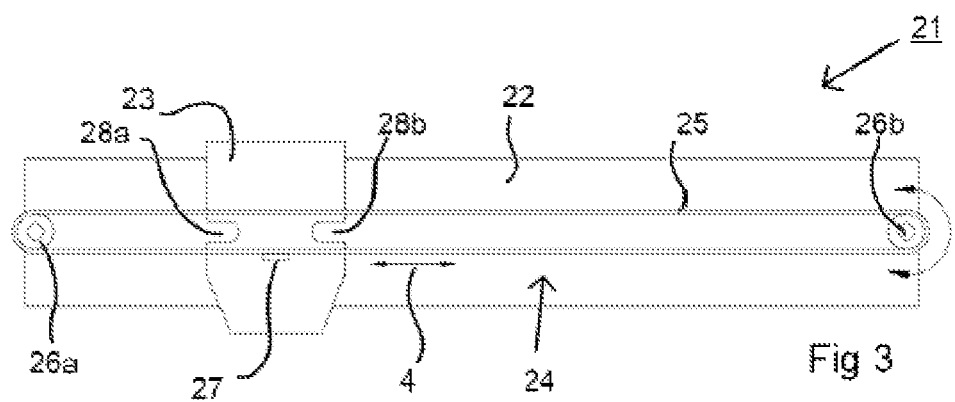
FIG. 3 shows a bottom view of a combination of a carrying body and a pusher body.

Combination 21 according to FIG. 3 comprises a slat 22 and a pusher shoe 23 movable relative to slat 22 to and fro in a sorting direction according to double-headed arrow 4. On the underside of slat 22, combination 21 is provided with a belt transmission 24 with a belt 25 that is passed round deflection pulleys 26a, 26b, which are connected rotatably about their respective centre lines via shaft bodies, not shown in more detail, to slat 22, on the underside thereof. One of the two deflection pulleys 26a, 26b is drivable by means of a servomotor, i.e. the electric motor, not shown in more detail, such as servomotor 17, whether or not via a transmission. Belt 24 is connected to pusher shoe 23, on the underside thereof, by means of connecting piece 27. In pusher shoe 23, at least on the underside thereof, two U-shaped recesses 28a, 28b are provided, in which the aforementioned shaft bodies may be located if pusher shoe 23 is in one of the two outer states, left and right in FIG. 3.

Alternatively, for driving a pusher shoe relative to a slat, it is also broadly speaking possible for a servomotor to be provided in or on the pusher shoe, for example in a manner that is comparable to the manner in which a direct-current motor is connected to a pusher shoe.

Servomotor 17 belonging to the further displacing device of combination 11 according to FIG. 2 and the servomotor belonging to the further displacing device of combination 21 according to FIG. 3 may be supplied with power by means of a battery, not shown in more detail. Charging of such a battery may for example be inductive, and thus contactless, or by means of sliding contacts.

For controlling the aforementioned servomotors, the system for sorting products is provided with a plurality of controllers 35, wherein each controller is provided on a combination of the elongated carrying body and the pusher body, and wherein each one of the plurality of controllers is arranged to control two or more of the further displacing devices by receiving destination data from a central control server 38 relating to a sorting location 32 where a product to be sorted should be pushed off of the carrying body and for driving the electric motor 33 in accordance with the received destination data.

The controllers 35 may for example comprise a microprocessor or a Field Programmable Gate Array (FPGA). The controllers 35 are configured for at least receiving data, for example directly from the central control server, relating to the sorting location 32 where a product to be sorted 80 should be pushed from the associated slat and relating to the position of the combination viewed in the direction of movement at least in the sorting path, and for controlling the associated servomotor 33.

The controller may further be configured with a ROM and/or RAM memory for storing data relating to the aforementioned sorting location and for determining the longitudinal position of the pusher shoe relative to the associated slat.

The power supply of the controllers 35 may take place in the same way as for the servomotor 17. In an alternative embodiment the controllers 35 may also be connected to a pusher body and move together with it in a sorting direction 4.

Pusher body 3 in FIG. 1 is provided on each of the two pusher surfaces 8 with two styli 9a, which are provided one after another in the direction of movement 5. Each stylus 9a has a spherical head 9b, a collar 9c and a compression spring 9d, extending partly within a horizontal hole 9e in pusher surface 8. Under the effect of contact between the product to be sorted that is located on carrying surface 6 and a head 9b of a stylus 9a, each stylus 9a is movable in the direction of the pusher surface 8, thus parallel to the sorting direction 4 relative to the pusher surface 8, against the action of compression spring 9d, until collar 9c comes up against an inside wall of hole 9e.

Figure 4:
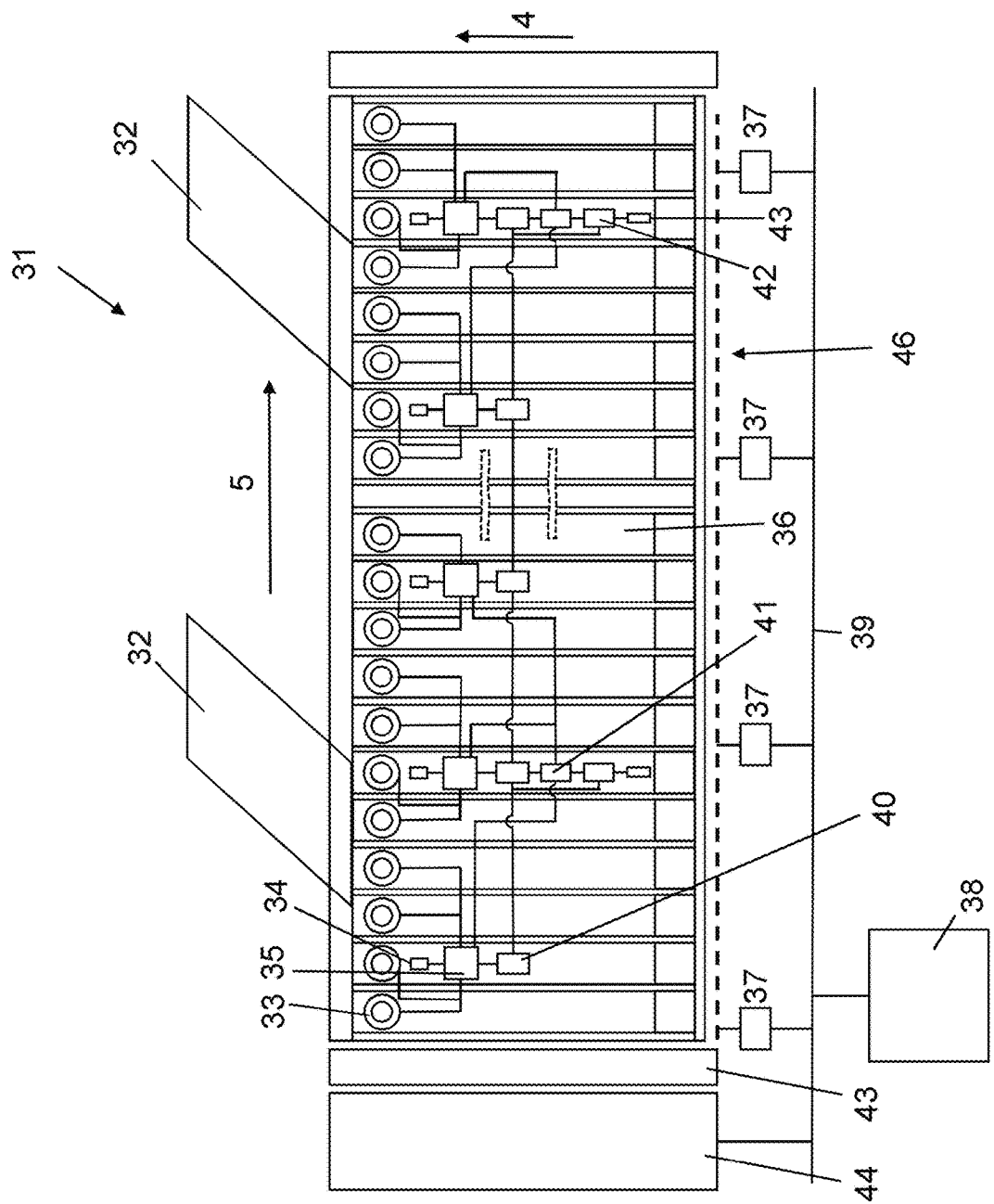
FIG. 4 shows a high level design of the system for sorting products in accordance with the present disclosure.

FIG. 4 shows a high level design of the system 31, in a top view, for sorting products in accordance with the present disclosure.

The system 31 for sorting products comprising a number of successive combinations 36 of an elongated carrying body and a pusher body, located one after another. Such a combination is explained in more detail with respect to the first three figures.

The combinations are movable in a direction of movement 5 following a path along which a number of sorting locations are provided, wherein the carrying bodies extend parallel to each other and perpendicular to the direction of movement 5 and wherein the carrying bodies are configured for carrying the products to be sorted.

Here, the sorting locations are connected to the exit feeds as indicated with reference numeral 32.

The sorting system 31 further comprises a displacing device for moving the combinations in the direction of movement 5 along the path.

Each combination is further provided with a further displacing device comprising an electric motor 33 for moving the pusher body in a sorting direction 4 along the carrying body, the sorting direction 45 extending perpendicularly to the direction of movement 5, for pushing a product carried by the carrying body off of the carrying body with the pusher body.

A plurality of controllers 35 is provided, wherein each controller 35 is provided on a combination of the elongated carrying body and the pusher body, and wherein each one of the plurality of controllers is arranged to control two or more of the further displacing devices by receiving destination data from a central control server relating to a sorting location where a product to be sorted should be pushed off of the carrying body and for driving the electric motor in accordance with the received destination data.

The system 31 further comprises at least one stationary Access Point, (AP), 37 wherein the at least one AP 37 is arranged to communicate with the plurality of controllers 35 and with the central control server 38;

The central control server 38 is arranged for transmitting destination data relating to the sorting location where a product to be sorted should be pushed off of the carrying body, to one or more of the plurality of controllers 35 via the at least one stationary placed AP 37.

Here below, a specific implementation of the system 31 is provided. The present disclosure is not to be limited to this specific implementation.

A leaky coaxial antenna 46 is provided alone on of the side frames of the system 31. The leaky coaxial antenna 46 makes it possible to communicate between moving parts of the system 31 to stationary parts of the system. As such, antennas 43 may be provided on the combinations, which antennas 43 also move, in operation, in the direction of movement 5. The antennas 43 are able to transfer message to and from the leaky coaxial cable. The antennas 43 may be connected to a gateway 42, i.e. a client module. The gateway 42 connects via a switch 41 to the different controllers 35.

Preferably, there is a fixed clear line of sight between the antennas 43 and the leaky coax antenna 46 to ensure a stable connection of the moving gateways 42 to the system network via the access points 37.

The controllers 35 may be implemented as embedded controllers, and the controllers may thus be interconnected to each other via the switch 41. Typically, there is no need for communication directly between the controllers 35 itself. The central server 38 may act as a central decision maker for providing control signals to each of the controllers 35 for ensuring that the shoes of each of the combinations that the controllers 35 are responsible for are actuated correctly.

Synchronization issues between the controllers 35 may thus be tackled from the central server 38 perspective.

An optional section of the leaky coaxial antenna 46 can be placed at the bottom part of the system as is shown in FIG. 5, i.e. the return route 77. The optional section can, for example, be used in case of double-sided sorting, as commands can be sent to the controllers on the return route in order to determine the required initial side of the shoes. Initially shoes may be on the right side for left side sorting and vice versa. The optional section is not only limited to the double-sided sorting case. For instance, it can be useful for logging relatively large amounts of data from controllers on the return route, which can be useful of applications such as preventative maintenance.

With a cluster size of four, a set of four motors 33 are connected to a single controller 35. A photoelectric sensor 34 may be connected to each controller 35, which is used along with a positioning frame to localize the corresponding cluster. Both a scanner 44, if present in the system, and the central server 38 may be connected to the same network as all controllers 35. The connection between the access points 37 and the central server 38 may, preferably, be wired. The scanner 44 is elucidated in more detail later below.

As for power transmission, power rails may be fitted on one of the side frames of the sorter. Current collectors may be fitted on the moving carriers and connected to the power pickup units that are fixed on the carriers.

FIG. 5 shows a side view of 71 a system in accordance with the present disclosure.

The leaky coax cable, as indicated with reference numeral 75, is not moving during operation. The combinations are indicated with reference numeral 74. The scanner is indicated with reference numeral 72 and the charge section is indicated with reference numeral 73.

As previously mentioned, the system may further comprises the scanner 44 arranged for obtaining at least one of product parameters of the products to be sorted, and for providing these product parameters to the central control server.

The product parameters are any of:
Identifications, ID's, related to which two or more carrying bodies are carrying a particular product to be sorted;
a length and/or a width parameter of a particular product to be sorted;
an offset, in the sorting direction, of a particular product to be sorted on a carrying body from an initial position of the corresponding pusher body.

The offset of a product may be regarded as the position of the product on a combination in the sorting direction. This information may be helpful during the sorting process. The controllers may be arranged to ensure that a product to be sorted, is sorted with any of a predetermined velocity, a predetermined rotation, or anything alike.

The predetermined velocity is, for example, a velocity which is tuned to the velocity of the endless transport path of the exit feed. If, for example, the transport path of the exit feed is transporting the products at about 3 meter per second, then it would be advantageous if the product to be sorted has a peak velocity that corresponds to the 3 meter per second such that the system is tuned to the exit feed. For example, using the Pythagorean theorem, the above described peak velocity may be equal to the square root of the squared velocity of the endless transport path of the exit feet minus the squared velocity of the product in the direction of movement 5.

The offset of a particular product, and together with the width of the system, being the length of a combination, determines the total amount of runway available for a controller to reach that particular "exit" velocity. If a product is close to the opposite side of an exit feed, a relatively long runway may exist such that the product does not necessarily need to be accelerated in a high manner.

However, if the product is close to the exit feed, a relatively short runway may exist such that the product may need to be accelerated rapidly.

The controller may use the offset of a product as an input for determining the acceleration parameter of a product. The controller may further use the velocity of the exit feed as an input for determining the acceleration parameter of a product. The controller may also use the exit feed angle as an input for determining the required rotation of a product. The controller may also use the length and width parameters of a product as an input for determining the required rotation of a product.

Figure 6:
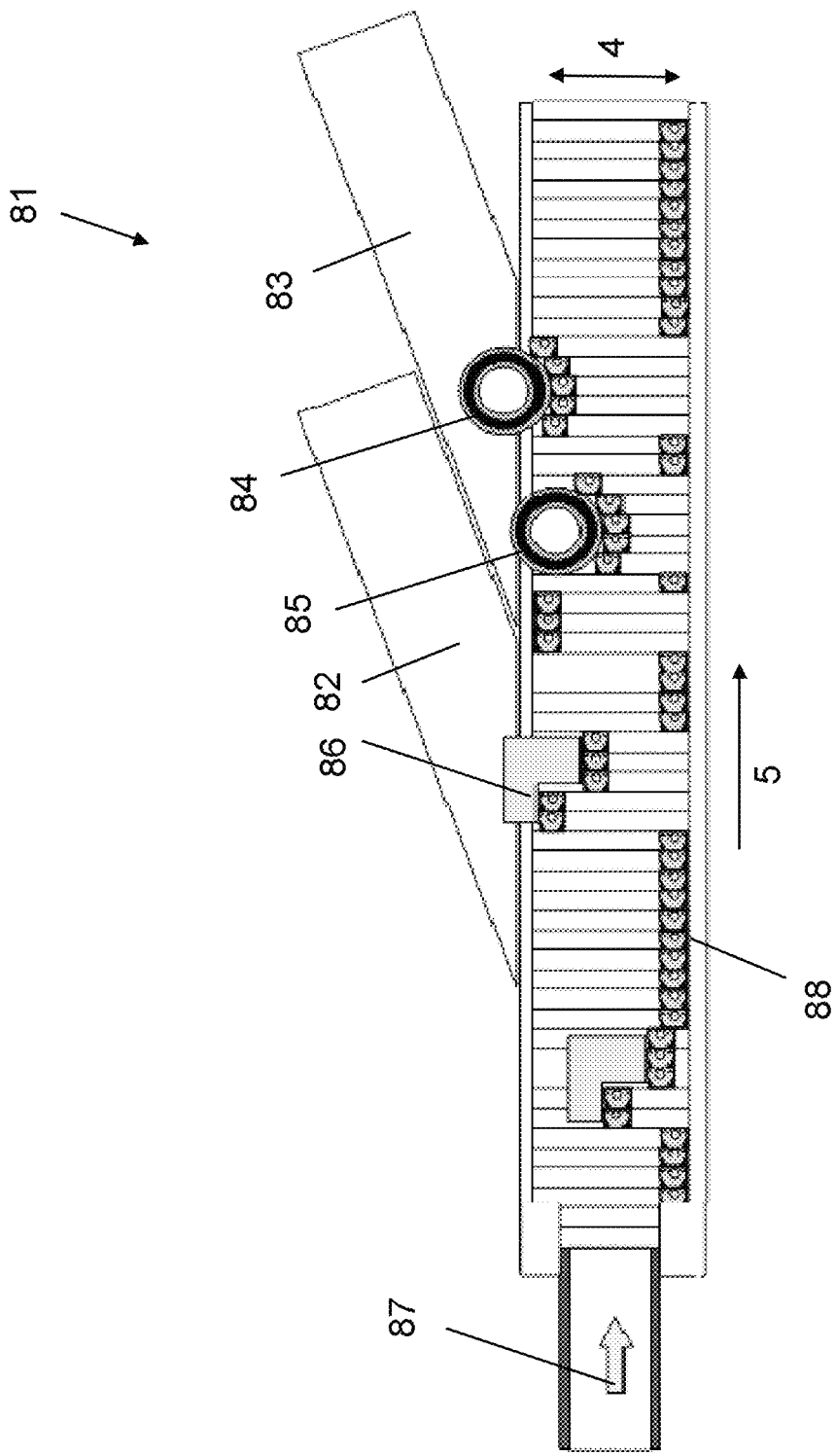
FIG. 6 shows a top view of a system in accordance with the present disclosure.

FIG. 6 shows a top view 81 of a system in accordance with the present disclosure.

Products to be sorted are fed to the combinations as indicated with the arrow 87. The shoes are indicated with reference numeral 88.

As one can see, the product to be sorted 84, 85, 86 may have different shapes and forms. Products indicated with reference numeral 84, 85 may, for example, be car tyres. These kinds of products are circular and may require a different handling compared to other types of products like the one having reference numeral 86.

It is noted that the products having reference numerals 84 and 85 are associated with five combinations, and thus also with five pusher bodies also known as shoes. The L-shaped products as indicated with reference numeral 86 is also associated with five combinations, and thus also with five pusher bodies/shoes.

In the present example, two outfeeds are connected to the system as indicated with reference numerals 82 and 83.

The presented system may be especially suitable for sorting products having different forms and shapes. That is, a scanner (not shown in FIG. 6) may provide information with respect to the identifications of the combinations, or pusher bodies, to the controllers, and may provide information with respect to the form or shape of the product to be sorted. This allows the controller to control the pusher body into an initial state wherein the pusher bodies are aligned with the product to be sorted. This is, for example, shown with reference numeral 88, wherein the associated pusher bodies are in contact with the product to be sorted. Once the product to be sorted reaches the outfeed, the pusher bodies may be controlled in such a way that they actually push the corresponding product into the outfeed.

One of the advantages of the present disclosure is that each pusher body may be controlled separately, individually and independently such that the sorting process can be tailored to each individual product.

It is noted that the present disclosure is also directed to a system for sorting products comprising:
a number of successive combinations of an elongated carrying body and a pusher body, located one after another, which combinations are movable in a direction of movement following a path along which a number of sorting locations are provided, wherein the carrying bodies extend parallel to each other and perpendicular to the direction of movement and wherein the carrying bodies are configured for carrying the products to be sorted,
a displacing device for moving the combinations in the direction of movement along the path,
wherein each combination is further provided with a further displacing device comprising an electric motor for moving the pusher body in a sorting direction along the carrying body, the sorting direction extending perpendicularly to the direction of movement, for pushing a product carried by the carrying body off of the carrying body with the pusher body,
a plurality of controllers, wherein each controller is provided on a combination of the elongated carrying body and the pusher body, and wherein each one of the plurality of controllers is arranged to control two or more of the further displacing devices by receiving destination data from a central control server relating to a sorting location where a product to be sorted should be pushed off of the carrying body and for driving the electric motor in accordance with the received destination data;
the central control server arranged for transmitting destination data relating to the sorting location where a product to be sorted should be pushed off of the carrying body, to one or more of the plurality of controllers.

Wherein the communication between the plurality of controllers and the central control server is based on a wireless communication technology and, preferably, a 5G telecommunication technology.

The inventors have found that the 5G telecommunication technology provides for a low latency, a high bandwidth and is able to accommodate many users at the same time such that the utilization of the 5G telecommunication technology in a system in accordance with the present disclosure may be considered.

The invention claimed is:

1. System for sorting products comprising:
a number of combinations of an elongated carrying body and a pusher body, located one after another, which combinations are movable in a direction of movement following a path along which a number of sorting locations are provided, wherein the carrying bodies extend parallel to each other and perpendicular to the direction of movement and wherein the carrying bodies are configured for carrying the products to be sorted,
a displacing device for moving the combinations in the direction of movement along the path,
wherein each combination is further provided with a further displacing device comprising an electric motor for moving the pusher body in a sorting direction along the carrying body, the sorting direction extending perpendicularly to the direction of movement, for pushing a product carried by the carrying body off of the carrying body with the pusher body,
a plurality of controllers, wherein each controller is provided on a combination of the elongated carrying body and the pusher body, and wherein each one of the plurality of controllers is arranged to control two or more of the further displacing devices by receiving destination data from a central control server relating to a sorting location where a product to be sorted should be pushed off of the carrying body and for driving the electric motor in accordance with the received destination data;
at least one stationary Access Point, AP, wherein the at least one stationary AP is arranged to communicate with the plurality of controllers and with the central control server; and
the central control server arranged for transmitting destination data relating to the sorting location where a product to be sorted should be pushed off of the carrying body, to one or more of the plurality of controllers via the at least one stationary AP.

2. The system in accordance with claim 1, wherein each controller of the plurality of controllers is arranged to control between 4-6 of the further displacing devices.

3. The system in accordance with claim 1, wherein the system further comprises:
  a stationary placed leaky coax cable extending along the direction of movement along the path, and wherein the leaky coax cable is connected to the at least one stationary AP; and
  a plurality of antennae, wherein each antenna is provided at an elongated carrying body of a corresponding combination such that the antenna is proximal to the stationary placed leaky coax cable, wherein each antenna allows for communication between the stationary at least one AP and the plurality of controllers.

4. The system in accordance with claim 1, wherein the system further comprises:
  one or more gateways, wherein each of the one or more gateways is provided on a combination of the elongated carrying body and the pusher body, and wherein each of the one or more plurality of controllers is uniquely connected to one of the one or more gateways, and wherein each of the one or more gateways is arranged to communicate with the central control server, via the at least one AP.

5. The system in accordance with claim 4, wherein each of the one or more gateways comprises one of a plurality of antennae.

6. The system in accordance with claim 1, wherein the system further comprises a scanner arranged for obtaining at least one of product parameters of the products to be sorted, and for providing these product parameters to the central control server, wherein the product parameters are any of:
  Identifications, ID's, related to which two or more carrying bodies are carrying a particular product to be sorted;
  a length and/or a width parameter of a particular product to be sorted; or
  an offset, in the sorting direction, of a particular product to be sorted on a carrying body from an initial position of the corresponding pusher body.

7. The system in accordance with claim 6, wherein the central control server is arranged for selecting one or more of the plurality of controllers based on the Identifications, ID's, received from the scanner, and wherein the central control server is further arranged for transmitting the product parameters being any of a length parameter, a width parameter, or offset parameter to the selected one or more of the plurality of controllers.

8. The system in accordance with claim 7, wherein each of the selected one or more of the plurality of controllers is arranged for controlling corresponding further displacing devices based on any of a length parameter, a width parameter, or offset parameter.

9. The system in accordance with claim 1, wherein each of the one or more of the plurality of controllers is arranged for controlling further displacing devices based on sorter parameters to an outfeed connected to the system, wherein the sorter parameters are any of:
  an outfeed angle being an angle between the sorting direction and an outfeed direction;
  a width of the outfeed;
  a location of the outfeed; or
  expected speed of the product to be sorted on the outfeed.

10. The system in accordance with claim 8, wherein each of the plurality of controllers is arranged for determining a sorting profile for a corresponding pusher body based on any of the sorter parameters and the product parameters, wherein the sorting profile relates to a position of the pusher body with respect to its corresponding elongated carrying body.

11. The system in accordance with claim 10, wherein each of the plurality of controllers is arranged for:
  controlling a corresponding pusher body, via the further displacing device, to an initial position such that the corresponding pusher body is against, or close to, a product to be sorted; and
  sorting the product to be sorted by controlling the further displacing device, at the sorting location, such that the corresponding pusher body follows the sorting profile starting from the initial position.

12. A method of sorting a product to be sorted, using a system in accordance with claim 1, wherein the method comprises the steps of:
  receiving, by one of the plurality of controllers, from the central control server via the at least one stationary AP, destination data relating to the sorting location where the product to be sorted should be pushed off of the carrying body; and
  controlling, by the one of the plurality of controllers, any of the two or more of the further displacing devices at the sorting location by driving the corresponding electric motor in accordance with the received destination data.

13. The method in accordance with claim 12, wherein the step of receiving comprises:
  receiving at least one of product parameters, wherein the product parameters are any of:
    Identifications, ID's, related to which two or more carrying bodies are carrying a particular product to be sorted;
    a length and/or a width parameter of a particular product to be sorted; or
    an offset, in the sorting direction, of a particular product to be sorted on a carrying body from an initial position of the corresponding pusher body,
  and wherein the step of controlling is further based on any of the product parameters.

14. The method in accordance with claim 13, wherein the step of receiving comprises:
  receiving at least one of sorter parameters relating to an outfeed connected to the system, wherein the sorter parameters are any of:
    an outfeed angle being an angle between the sorting direction and an outfeed direction of an outfeed connected to the system;
    a width of the outfeed;
    a location of the outfeed; or
    expected speed of the product to be sorted on the outfeed;
  and wherein the step of controlling is further based on any of the sorter parameters.

15. The method in accordance with claim 14, wherein the method further comprises the step of:
  determining, by the one of the plurality of controllers, a sorting profile for a corresponding pusher body based on any of the product parameters and/or the sorter parameters, wherein the sorting profile relates to a position of the pusher body with respect to its corresponding elongated carrying body, and wherein the step of controlling comprises controlling the corresponding further displacing device such that the corresponding pusher body follows the sorting profile.

16. The method in accordance with claim 15, wherein the method further comprises the steps of:
controlling, by the one of the plurality of controllers, a corresponding pusher body, via the further displacing device, to an initial position such that the corresponding pusher body is against, or close to, a product to be sorted; and
sorting, by the one of the plurality of controllers, the product to be sorted by controlling the further displacing device, at the sorting location, such that the corresponding pusher body follows the sorting profile.

17. A computer readable medium having instructions stored thereon which, when executed by a controller, cause the controller to implement a method in accordance with claim 12.

* * * * *